(12) United States Patent
Norris et al.

(10) Patent No.: US 7,139,249 B2
(45) Date of Patent: Nov. 21, 2006

(54) METHOD AND APPARATUS FOR AN AUDIO BRIDGE

(75) Inventors: David J. Norris, Portland, OR (US); Robert M. Odell, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 10/017,852

(22) Filed: Dec. 12, 2001

(65) Prior Publication Data

US 2003/0185218 A1    Oct. 2, 2003

(51) Int. Cl.
*H04L 12/16* (2006.01)

(52) U.S. Cl. ............ 370/261; 379/202.01; 379/207.01

(58) Field of Classification Search ........ 370/260–271; 455/416; 379/202.01–205.01, 93.21, 157–158
See application file for complete search history.

(56) References Cited

U.S. PATENT DOCUMENTS

| 5,436,896 | A * | 7/1995 | Anderson et al. ........... 370/260 |
| 5,812,653 | A * | 9/1998 | Jodoin et al. .......... 379/205.01 |
| 6,262,978 | B1  | 7/2001 | Bruno et al. |
| 6,272,214 | B1 * | 8/2001 | Jonsson ................ 379/202.01 |
| 6,407,996 | B1 * | 6/2002 | Witchalls .................... 370/352 |
| 6,556,563 | B1 * | 4/2003 | Yarlagadda ................. 370/352 |
| 6,839,416 | B1 * | 1/2005 | Shaffer ................. 379/202.01 |
| 6,850,609 | B1 * | 2/2005 | Schrage ................. 379/202.01 |
| 2001/0023430 | A1 * | 9/2001 | Srinivasan .................. 709/204 |
| 2001/0048678 | A1 | 12/2001 | Witchalls |
| 2002/0078150 | A1 * | 6/2002 | Thompson et al. ......... 709/204 |
| 2002/0085697 | A1 * | 7/2002 | Simard et al. ......... 379/202.01 |

FOREIGN PATENT DOCUMENTS

| EP | 0 808 048 A2 | 11/1997 |
| EP | 1 091 550 A2 | 4/2001 |
| WO | WO 01/54354 A1 | 7/2001 |
| WO | WO 01/72022 A1 | 9/2001 |

OTHER PUBLICATIONS

Thom, G. A., "H.323: The Multimedia Communications Standard for Local Area Networks," IEEE Communications Magazine, vol. 34, No. 12, Dec. 1, 1996, pp. 52-56, XP-000636454, IEEE Service Center, Piscataway, New Jersey, USA.

* cited by examiner

*Primary Examiner*—Wellington Chin
*Assistant Examiner*—Thai Hoang
(74) *Attorney, Agent, or Firm*—Kacvinsky LLC (57) ABSTRACT

A method and apparatus to form an audio bridge session are described.

19 Claims, 4 Drawing Sheets

METHOD AND APPARATUS FOR AN AUDIO BRIDGE

BACKGROUND

An audio bridge session may be a telephone communication session between multiple parties. Each party may communicate with other parties participating in the session similar to a conference call. Audio bridge sessions may be particularly advantageous when parties are geographical remote from one another thereby making face-to-face meetings difficult to attend. As with many technologies, there may be significant advantages in reducing the amount of work needed to arrange or participate in an audio bridge session. Consequently, there may be a need for improved audio bridge technology to provide such advantages.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to provide an audio bridge session. The embodiments of the invention may reduce the amount of effort needed to arrange an audio bridge session. The embodiments of the invention may also reduce the amount of effort needed to participate in an audio bridge session. In addition, the embodiments of the invention may also decrease costs associated with creating an audio bridge session. These and other advantages may become more apparent as discussed below.

Conventional audio bridge technology may be unsatisfactory for a number of reasons. For example, one technique to create an audio bridge session is to manually add callers to a conference call. This may be cumbersome and time-consuming for the person setting-up the conference call. Furthermore, the number of parties may be limited by the number of available telephone lines at the device used to set-up the conference call. Another technique to create an audio bridge session may be to have a telephone company arrange the conference call. This may involve, however, a significant amount of advanced planning, such as giving an operator a list of all parties, their telephone numbers and a time for the conference call. Another technique to create an audio bridge session may be through an automated system. Each party may be given a bridge number and a bridge code. Each party may then call the bridge number, enter the bridge code, and be connected to the other parties on the bridge. This method, however, may also require a significant amount of advanced planning, such as ordering a certain number of bridge lines and disseminating the bridge information to all participants. Participants may also enter bridge information incorrectly and, as a result, may be subject to a maze of choices by the automated system.

One embodiment of the invention may reduce one or more of the above problems by providing an audio bridge session over a packet network. An access number for a call terminal connected to the packet network may be designated as a bridge number. This may be accomplished using a bridge table having the access number and information indicating whether the access number is also a bridge number. Multiple call requests for the same access number may be automatically conferenced together to form an audio bridge session if the access number is designated as a bridge number.

In this detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

An embodiment of the invention may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
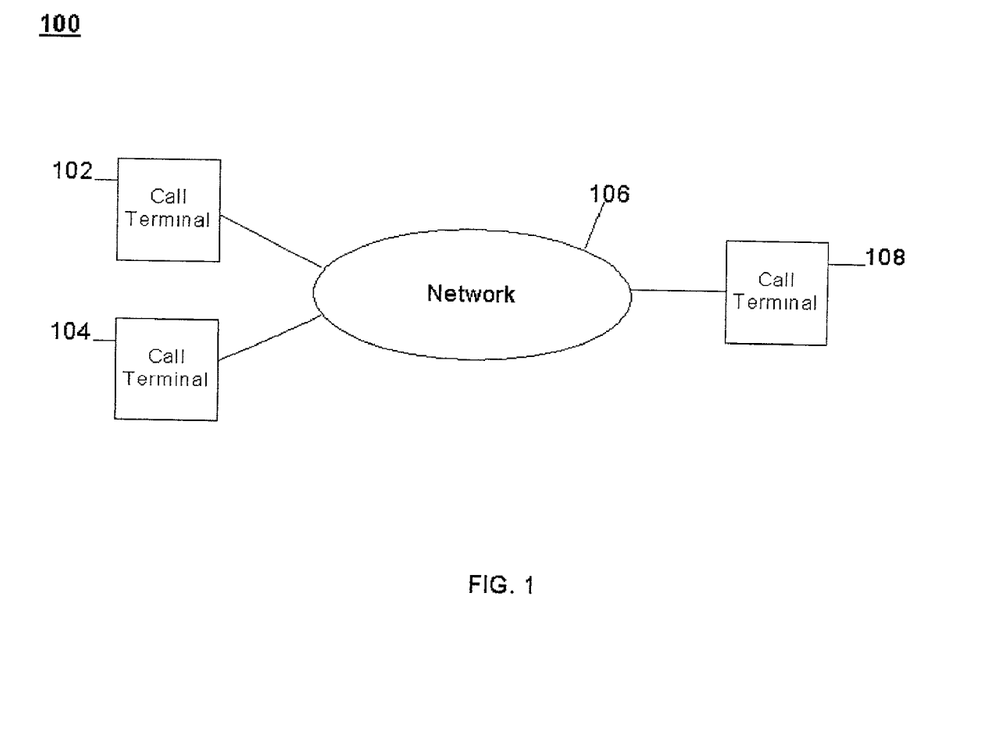
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of an audio bridge system 100. Audio bridge system 100 may comprise, for example, call terminals 102, 104 and 108, all connected by a network 106. Examples of a call terminal may include any conventional telephone set capable of communicating audio signals over a network.

Network 106 may comprise, for example, a packet network. In one embodiment of the invention, network 106 may operate in accordance with, for example, one or more Internet protocols such as the Transmission Control Protocol (TCP) as defined by the Internet Engineering Task Force (IETF) standard 7, Request For Comment (RFC) 793, adopted in September, 1981, and the Internet Protocol (IP) as defined by the IETF standard 5, RFC 791, adopted in September, 1981, both available from "www.ietf.org", although the embodiments of the invention are not limited to this context. In one embodiment of the invention, network 106 may also include circuit-switched technologies and appropriate interfaces to packet network technologies.

More particularly, network 106 may operate in accordance with one or more protocols to communicate packets representing audio or voice information, a technique collectively referred to herein as "Voice Over IP" or "VoIP." In one embodiment of the invention, for example, network 106 may operate in accordance with the International Telecommunications Union (ITU) Recommendation H.323 titled "Packet-based Multimedia Communication Systems," published in November 2000 and available from "www.itu.int" ("H.323 Specification"). In one embodiment of the invention, for example, network 106 may operate in accordance with "SIP: Session Initiation Protocol" as defined by the IETF Proposed Standard, RFC 2543, published in March 1999, and available from "www.ietf.org," ("SIP Specification). Although specific examples are discussed herein, it may be appreciated that the embodiments of the invention are not limited in this context.

Figure 2:
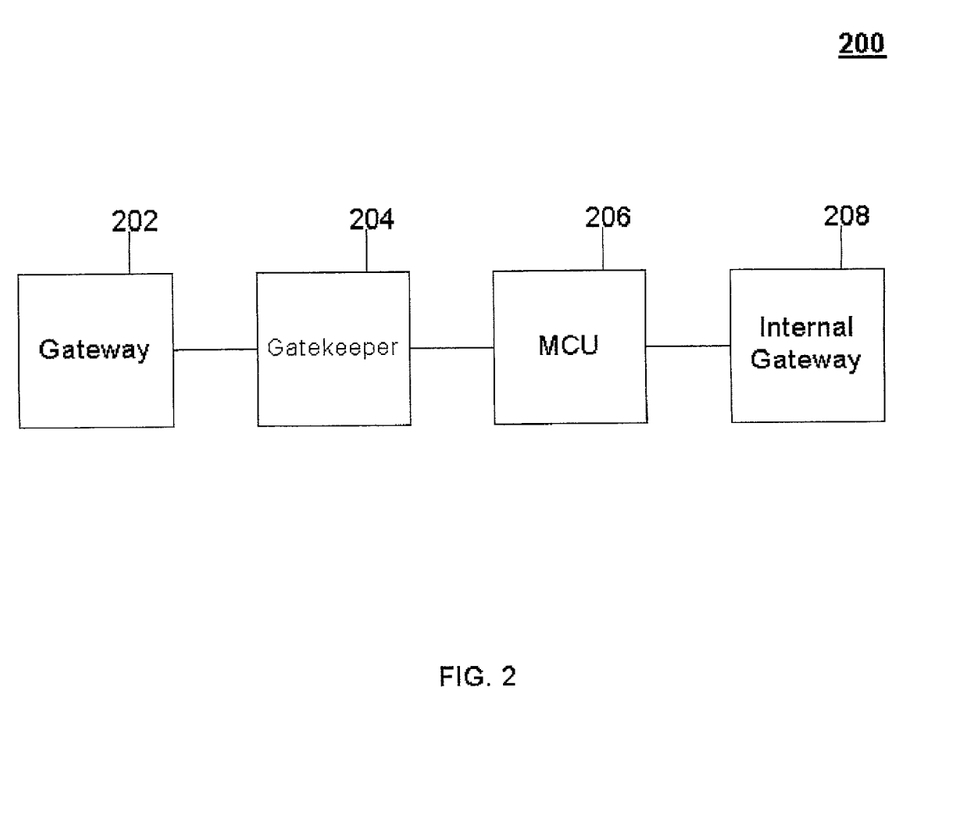
FIG. 2 is a block diagram of an audio bridge network in accordance with one embodiment of the invention.

FIG. 2 is a block diagram of an audio bridge network in accordance with one embodiment of the invention. FIG. 2 may illustrate an audio bridge network 200 that may represent, for example, network 106. In one embodiment of the invention, audio bridge network 200 may comprise, for example, a gateway 202, a gatekeeper 204 a multi-point control unit (MCU) 206 and an internal gateway 208.

Gateway 202 may comprise a device to convert a conventional telephony call to an IP telephony call or VoIP call. Gateway 202 may receive signals from a circuit-switched network, such as the Public Switched Telephone Network (PSTN), and convert the circuit-switched signals into packets. The conversion to packets may be made in accordance with, for example, the TCP/IP Specification and H.323 Specification. Gateway 202 may communicate the packets through other components of network 200 until the packets reach their intended destination, e.g., a call terminal connected to network 200.

Gatekeeper 204 may perform conventional gatekeeper functions, such as address translation, admission control, call control signaling, call authorization, call management and so forth in accordance with the H.323 Specification. For example, gatekeeper 204 may provide address and routing information to communicate packets through network 200 to the destination call terminal.

In one embodiment of the invention, gatekeeper 204 may also include processing logic to manage and utilize a bridge table as discussed previously. The bridge table may include access numbers for one or more call terminals connected to network 200. The access numbers may have associated information to indicate whether the access number is also configured to operate as a bridge number. The associated information may be, for example, a bridge field with a flag that is set when the access number is a bridge number, and not set when the access number is not a bridge number. Additional information may include any standard bridge parameters, such as a predetermined time interval for the amount of time the access number is to operate as a bridge number, a number of bridge lines, access codes if needed for security purposes, and so forth. It is worthy to note that the bridge table may be implemented by any conventional data structure.

Gatekeeper 204 may also include a user interface to allow a user to modify the bridge table with current information. The user interface may be configured to operate with, for example, messages sent from a computer equipped with a web browser, or messages in the form of Dual-Tone Multi-Frequency (DTMF) signals.

In operation, gatekeeper 204 may receive a first call request to establish a first connection between a first call terminal and a second call terminal. The first call request may include an access number for the second call terminal. An example of an access number may be, for example, a full or abbreviated telephone number. Gatekeeper 204 may complete the first connection and update its records accordingly. If gatekeeper 204 receives a second call request to establish a second connection between a third call terminal and the second call terminal, gatekeeper 204 may check its records and determine that the second call terminal is already engaged in the first connection with the first call terminal. Typically, gatekeeper 204 may respond to the second call request with an indication that the second call terminal is "busy."

In accordance with one embodiment of the invention, however, gatekeeper 204 may first search the bridge table to determine whether the access number is a bridge number. If the access number is not a bridge number, gatekeeper 204 may respond with the busy signal indication per normal procedures. If the access number is a bridge number, however, gatekeeper 204 may complete the second connection and transfer both the first and second connections to MCU 206 in order to establish a conference call between the first call terminal, second call terminal and third call terminal. This may be accomplished, for example, by mixing the streams of audio information communicated over the first and second connections using any conventional packet conferencing technique. The term "audio information" as used herein may refer to any information or signals representing voice, speech or any other utterances by a human voice. The streams of audio information may be, for example, in the form of packets in accordance with the TCP/IP Specification and H.323 Specification. The term "mixing" as used herein may refer to combining packets, portions of packets, or audio information represented therein.

In one embodiment of the invention, gatekeeper 204 may be configured to complete the first call request directly through MCU 206. This would avoid the need to later transfer the first call connection to MCU 206 thereby reducing the time needed to complete the audio bridge session.

MCU 206 may implement conventional MCU, multipoint controller (MC) and multipoint processor (MP) functions in accordance with the H.323 Specification, and may also implement general conference control (GCC) and multipoint communication service (MCS) functions. MCU 206 may process a multipoint conference call, and may depacketize encapsulated packets of multiple streams of audio information to form an audio bridge session. For example, MCU 206 may receive the streams of audio information from the first and second connections and multiplex/demultiplex the streams together to enable call terminals 102, 104 and 108 to communicate audio information between each other.

Internal gateway 208 may operate similar to gateway 202. In one embodiment of the invention, internal gateway 208 may take packets of audio information and translate them into audio signals for use with a conventional call terminal or telephone. In another embodiment of the invention, the functions of gateway 208 may be performed by a call terminal, such as a VoIP call terminal. In yet another embodiment of the invention, the functions of gateway 208 may be performed by gateway 202, thereby obviating the need for gateway 208.

Figure 3:
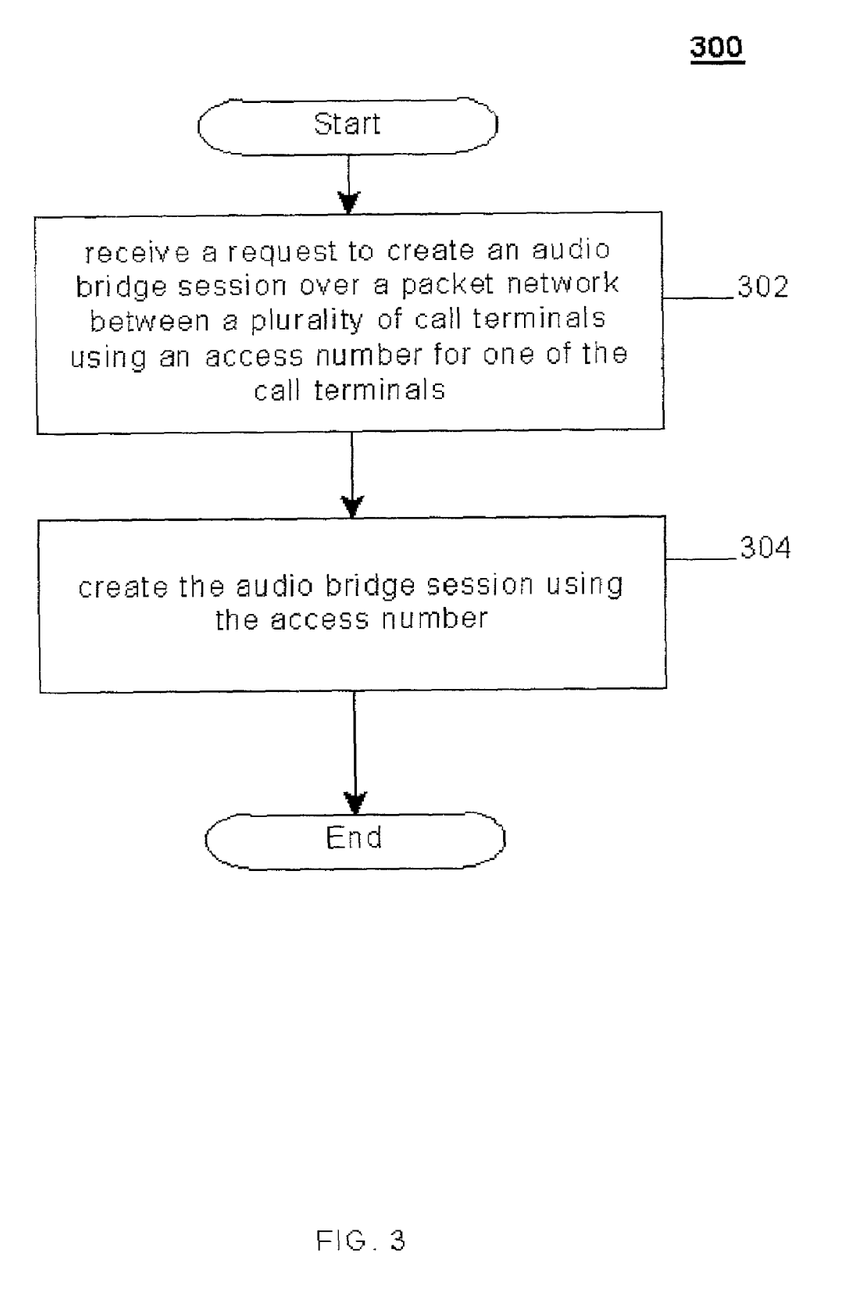
FIG. 3 is a block flow diagram of programming logic for a gatekeeper in accordance with one embodiment of the invention.
Figure 4:
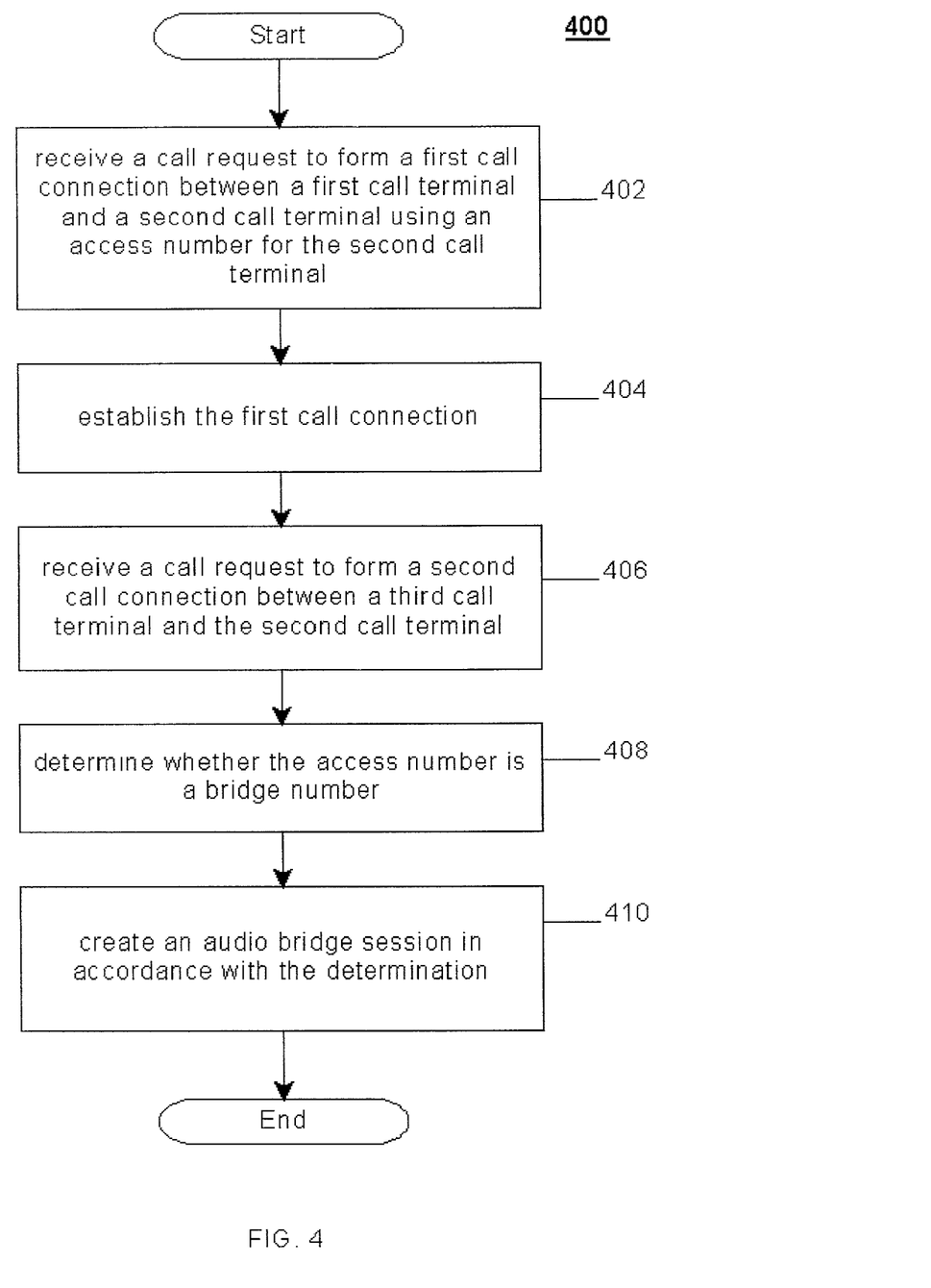
FIG. 4 is a block flow diagram of programming logic for a gatekeeper in accordance with another embodiment of the invention.

The operations of systems 100 and 200 may be further described with reference to FIGS. 3 and 4 and accompanying examples. Although FIGS. 3 and 4 presented herein may include a particular processing logic, it can be appreciated that the processing logic merely provides an example of how the general functionality described herein can be implemented. Further, each operation within a given processing logic does not necessarily have to be executed in the order presented unless otherwise indicated.

FIG. 3 is a block flow diagram of the programming logic performed by a gatekeeper in accordance with one embodiment of the invention. In one embodiment of the invention, the gatekeeper may include the software and/or hardware used to implement the functionality for creating an audio bridge session as described herein. It can be appreciated that this functionality, however, may be implemented by any device, or combination of devices, located anywhere in network 106 or network 200 and still fall within the scope of the invention.

FIG. 3 illustrates a programming logic 300. Programming logic 300 may provide an audio bridge by receiving a request to create an audio bridge session over a packet network between a plurality of call terminals using an access number for one of the call terminals at block 302. In one embodiment of the invention, the access number may be a telephone number. The packet network may operate, for example, in accordance with the TCP/IP Specification and H.323 Specification. An audio bridge session may be created using the access number at block 304.

In one embodiment of the invention, the audio bridge session may be created by first receiving a plurality of call requests with the access number. A determination may be made as to whether the access number is a bridge number using a bridge table. A call connection may be established for each call request if the access number is the bridge number. Each call connection may be combined to form the audio bridge session.

In one embodiment of the invention, each call connection may be combined by receiving a stream of packets representing audio information over each call connection. Each stream of packets may be directed to an intermediate device, such as MCU 206. The intermediate device may mix the stream of packets into the audio bridge session.

FIG. 4 is a block flow diagram of the programming logic performed by a gatekeeper in accordance with another embodiment of the invention. In this embodiment of the invention, the gatekeeper may include the software and/or hardware used to implement the functionality for creating an audio bridge session as described herein. It can be appreciated that this functionality, however, may be implemented by any device, or combination of devices, located anywhere in network 106 or network 200 and still fall within the scope of the invention.

FIG. 4 illustrates a programming logic 400. Programming logic 400 may form an audio bridge over a packet network. A call request to form a first call connection between a first call terminal and a second call terminal using an access number for the second call terminal may be received at block 402. A first call connection may be established at block 404.

A call request to form a second call connection between a third call terminal and the second call terminal may be received at block 406. A determination as to whether the access number is a bridge number may be made at block 408. At block 410, an audio bridge session may be created in accordance with the determination at block 408. For example, in one embodiment of the invention an audio bridge session may be created if the access number is identified as a bridge number. In another embodiment of the invention, an audio bridge session may be created unless the access number is not identified as a bridge number. This may be desired if the default configuration for all call terminals connected to a packet network should be to act as a bridge number unless specifically designated otherwise.

In one embodiment of the invention, the determination at block 408 may be made by searching a bridge table for the access number. A determination may be made as to whether the access number is identified as a bridge number using information stored in the bridge table.

In one embodiment of the invention, the audio bridge session may be created at block 410 by receiving a first stream of packets over the first call connection. The first stream of packets may be transferred to a MCU. The second call connection may be established. A second stream of packets may be received over the second call connection. The second stream of packets may also be transferred to the multi-point control unit. The MCU may then mix the first stream of packets with the second stream of packets. In one embodiment of the invention, the first and second streams of packets may represent, for example, audio information.

The operation of systems 100 and 200, and the processing logic shown in FIGS. 3 and 4, may be better understood by way of example. Assume that multiple parties want to have a conference call. One of the parties could access the user interface of gatekeeper 204 to designate their telephone number as a bridge number. The arranging party could send this information to the bridge participants. Alternatively, a business protocol may be established that the telephone number of the meeting organizer is the assumed bridge number thereby obviating the need to disseminate the bridge information. The bridge participants may then dial the telephone number of the arranging party to join the audio bridge session.

The first party may use their call terminal to dial the telephone number of the arranging party. The first call terminal may send a call request to gateway 202 requesting a first connection to the arranging party's call terminal, referred to in this example as the second call terminal. Gateway 202 may complete the first connection in accordance with standard call connection procedures. For example, the first call terminal may send the call request to gateway 202 via the PSTN. Gateway 202 may convert the circuit-switched signals to packets in accordance with the TCP/IP Specification and H.323 Specification. Gateway 202 may request information of gatekeeper 204 for call control, addressing and routing information. As part of the call connection process, gatekeeper 204 may determine whether the second call terminal is busy, and if not, may cause a signal to be sent indicating to the arranging party of an incoming telephone call. Once the arranging party picks up the telephone receiver, the first connection may be completed and the first party may now be capable of speaking with the arranging party.

Assume a second party uses their call terminal to dial the telephone number of the second call terminal. As with the first call terminal, the second party's call terminal, referred to in this example as the third call terminal, may send a call request to gateway 202 via the PSTN requesting a second connection to the second call terminal. Gateway 202 makes an information request of gatekeeper 204. Gatekeeper 204 determines that the second call terminal is already connected to the first call terminal via the first connection. Gatekeeper 204 may access its bridge table to determine whether the telephone number of the second call terminal is also a bridge number. If it is, Gatekeeper may complete the second connection to the second call terminal, and transfer both the first and second connections to MCU 206. MCU 206 may conference together the streams of audio information in the form of packets received over the first and second connections.

This process may be repeated for the other bridge participants. Since network 200 is a packet network, the number of bridge participants may be largely determined by the available bandwidth allocated to the second call terminal, as well as other factors such as the processing power of the MCU. For large numbers of bridge participants, gatekeeper 204 may provision the second call terminal with the appropriate amount of bandwidth as part of the arrangement process as requested via the user interface.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to provide an audio bridge, comprising:
receiving a request at a gatekeeper to create an audio bridge session over a packet network between a plurality of call terminals from one of said plurality of call terminals;
providing a bridge table at said gatekeeper, said bridge table having an access number for one of said plurality of call terminals and information indicating whether said access number is also a bridge number;
determining whether said access number associated with said one of said plurality of call terminals is also said bridge number; and
creating said audio bridge session between said plurality of call terminals in accordance with said determination.

2. The method of claim 1, wherein said access number is a telephone number.

3. The method of claim 1, wherein said creating comprises:
receiving a plurality of call requests with said access number;
determining whether said access number is a bridge number using a bridge table;
establishing a call connection for each call request if said access number is said bridge number; and
combining each call connection to form said audio bridge session.

4. The method of claim 3, wherein said combining comprises:
receiving a stream of packets representing audio information over each call connection;
directing each stream of packets to an intermediate device; and
mixing said streams of packets.

5. The method of claim 1, wherein said packet network operates in accordance with a Transport Control Protocol (TCP), Internet Protocol (IP) and H.323 Specification.

6. A method to form an audio bridge over a packet network, comprising:
receiving a call request to form a first call connection between a first call terminal and a second call terminal using an access number for said second call terminal;
establishing said first call connection;
receiving a call request to form a second call connection between a third call terminal and said second call terminal;
determining whether said access number is a bridge number;
creating an audio bridge session in accordance with said determination; and
designating an access number associated with at least one of said first, second, and third call terminals participating in said audio bridge session as said bridge number.

7. The method of claim 6, wherein said determining comprises:
searching a bridge table for said access number; and
determining whether said access number is identified as a bridge number using information stored in said bridge table.

8. The method of claim 6, wherein said creating comprises:
receiving a first stream of packets over said first call connection;
transferring said first stream of packets to a multi-point control unit;
establishing said second call connection;
receiving a second stream of packets over said second call connection;
transferring said second stream of packets to said multi-point control unit; and
mixing said first stream of packets and said second stream of packets.

9. The method of claim 8, wherein said streams of packets represent audio information.

10. An audio bridge system, comprising:
a gateway to convert audio information to packets;
a gatekeeper connected to said gateway, said gatekeeper having a bridge table, said bridge table having an access number for a call terminal and information indicating whether said access number is also a bridge number; and
a multi-point control unit (MCU) connected to said gatekeeper and said gateway to form an audio bridge session using said access number and packets received from said gateway, said gatekeeper to use said access number of said call terminal as a bridge number designated by said call terminal participating in said audio bridge session.

11. The audio bridge system of claim 10, wherein said packets are formed in accordance with the Transport Control Protocol (TCP), Internet Protocol (IP) and H.323 protocol.

12. The audio bridge system of claim 10, further comprising an internal gateway connected to said MCU to convert said packets to audio information.

13. The audio bridge system of claim 10, wherein said gatekeeper further comprises a user interface to modify said bridge table.

14. An article comprising:
a storage medium;
said storage medium including stored instructions that, when executed by a processor, result in providing an audio bridge by receiving a request to create an audio bridge session over a packet network between a plurality of call terminals from one of said plurality of call terminals, providing a bridge table having an access number for one of said plurality of call terminals and information indicating whether said access number is also a bridge number, determining whether said access number associated with said one of said plurality of call terminals is a also said bridge number, and creating said audio bridge session between said plurality of call terminals in accordance with said determination.

15. The article of claim 14, wherein the stored instructions, when executed by a processor, further result in said creating by receiving a plurality of call requests with said access number, determining whether said access number is a bridge number using a bridge table, establishing a call connection for each call request if said access number is said bridge number, and combining each call connection to form said audio bridge session.

16. The article of claim 15, wherein the stored instructions, when executed by a processor, further result in said combining by receiving a stream of packets representing audio information over each call connection, directing each stream of packets to an intermediate device, and mixing said streams of packets.

17. An article comprising:
   a storage medium;
   said storage medium including stored instructions that, when executed by a processor, result in forming an audio bridge over a packet network by receiving a call request to form a first call connection between a first call terminal and a second call terminal using an access number for said second call terminal, establishing said first call connection, receiving a call request to form a second call connection between a third call terminal and said second call terminal, determining whether said access number is a bridge number, and creating an audio bridge session in accordance with said determination, and designating an access number associated with at least one of said first, second, and third call terminals participating in said audio bridge session as said bridge number.

18. The article of claim 17, wherein the stored instructions, when executed by a processor, further result in said determining by searching a bridge table for said access number, and determining whether said access number is identified as a bridge number using information stored in said bridge table.

19. The article of claim 17, wherein the stored instructions, when executed by a processor, further result in said creating by receiving a first stream of packets over said first call connection, transferring said first stream of packets to a multi-point control unit, establishing said second call connection, receiving a second stream of packets over said second call connection, transferring said second stream of packets to said multi-point control unit, and mixing said first stream of packets and said second stream of packets.

* * * * *

UNITED STATES PATENT AND TRADEMARK OFFICE
CERTIFICATE OF CORRECTION

| | | |
|---|---|---|
| PATENT NO. | : 7,139,249 B2 | |
| APPLICATION NO. | : 10/017852 | |
| DATED | : November 21, 2006 | |
| INVENTOR(S) | : Norris et al. | |

It is certified that error appears in the above-identified patent and that said Letters Patent is hereby corrected as shown below:

In column 9, line 6, in Claim 14, after "is" delete "a".

Signed and Sealed this

Twentieth Day of February, 2007

JON W. DUDAS
*Director of the United States Patent and Trademark Office*